March 26, 1929.  I. B. LINEBARGER ET AL  1,706,794
ADJUSTABLE BACK SUPPORT
Filed Aug. 26, 1927
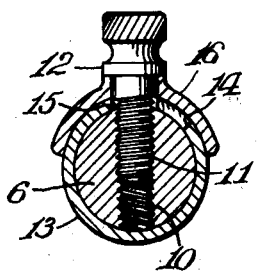
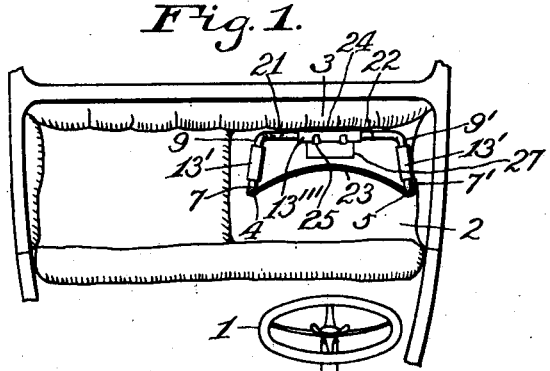
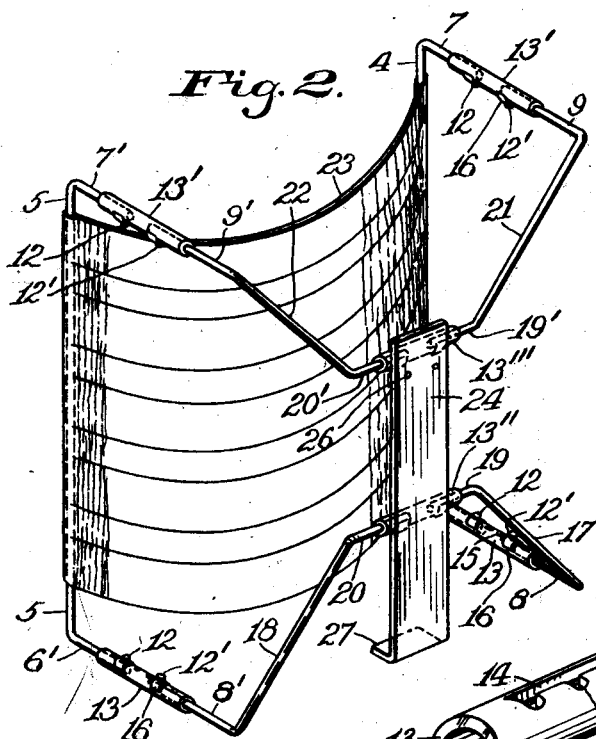
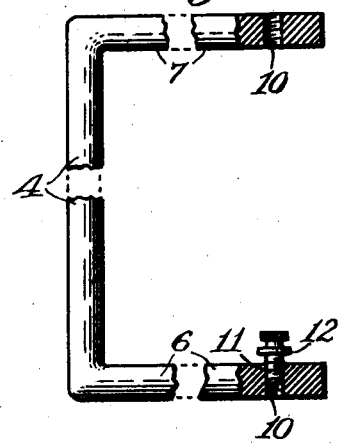
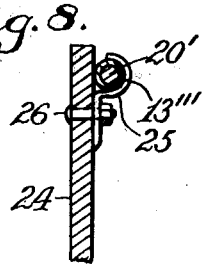
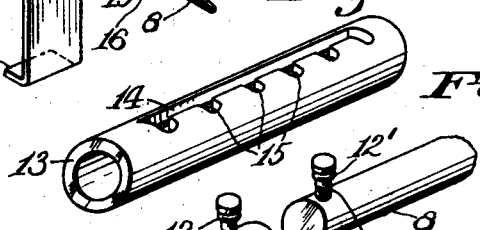
INVENTORS:
Iva B. Linebarger,
Wilbert F. Blue,
BY
E. T. Silvius,
ATTORNEY.

Patented Mar. 26, 1929.

1,706,794

UNITED STATES PATENT OFFICE.

IVA B. LINEBARGER, OF ROCKVILLE, AND WILBERT F. BLUE, OF MONTEZUMA, INDIANA.

ADJUSTABLE BACK SUPPORT.

Application filed August 26, 1927. Serial No. 215,688.

This invention relates to a portable support designed to be used as may be required or desired by a person when occupying a seat having a back, more particularly by operators of motor-vehicles, to afford a back support forward of the permanent seat back of the motor-vehicle, the invention having reference more particularly to a ventilated back support adapted to be used in connection with the seat back cushion of a motor-vehicle.

An object of the invention is to provide motor-vehicle seats with removable ventilated seat backs which shall not be costly, and which shall be adapted to afford comfort by preventing contact of a person with the cushion of the seat back that entails uncomfortable warmth of the person's back, especially during the summer season.

Another object is to provide an adjustable back support which shall be adapted to be used in connection with motor-vehicle seats when the seat is too large for the occupant, particularly when a small operator pressing against the seat back is unable conveniently to reach control pedals and levers for operating the motor-vehicle.

A further object is to provide an improved adjustable back support which shall be of such construction as to be of light weight and easily handled, which shall be particularly useful to small persons for obtaining comfortable support on motor-vehicle seats originally designed to accommodate very large people, which back support shall be adapted to be instantly applied for use without requiring alterations of seat structure, which may be quickly adjusted to the needs of the user and which shall be durable and economical in use.

With the above-mentioned and other objects in view, the invention consists in an open-work non-rigid frame of novel construction adapted to be removably supported upon a seat cushion and against a seat back cushion, and a flexible back-supporting part held under tension by the frame forward of the seat back cushion, the invention consisting further in the parts and combinations and arrangements of parts as hereinafter particularly described and claimed.

Referring to the drawings,—Figure 1 is a top plan of an automobile seat designed to be used by a driver or operator, and the improved back support appearing as when in use thereon, the position of the conventional steering wheel being indicated; Fig. 2 is a rear perspective view of the improved back support as preferably constructed; Fig. 3 is a side elevation of one of the principal members of the back support frame on an enlarged scale, partially broken away; Fig. 4 is a perspective view of a coupling sleeve, of which a plurality preferably are used to connect frame parts adjustably together; Figs. 5 and 6 are fragmentary perspective views of relatively adjustable frame parts adapted to operate in connection with the sleeve; Fig. 7 is a transverse section on an enlarged scale showing the mode of operation of the sleeve; and Fig. 8 is a fragmentary section of a back plate preferably connected to the rearward portion of the back support frame to afford relatively large bearing in connection with the seat back cushion and also with the seat cushion as a steadying device.

Similar reference characters in the different figures of the drawings indicate corresponding elements or features of construction herein referred to in detail.

In the drawings the numeral 1 indicates a motor-vehicle steering wheel, 2 the driver's seat cushion and 3 the seat back cushion of the conventional type.

In carrying out the objects of invention a skeleton frame is provided which is composed mainly of metallic rods, portions of two rods being straight and adapted to constitute normally upright posts 4 and 5, the lower ends of the posts having integral horizontal base rail members 6 and 6', the upper ends having similar top rail members 7 and 7' respectively. The base rails have relatively extensible base members 8 and 8' respectively and the top rails have relatively extensible members 9 and 9' respectively. Each rail member has a screw-threaded hole 10 therein and the holes in two adjacent members have binding screws 11 and 11' respectively, the screws having heads 12 and 12' respectively. A suitable number of coupling sleeves are provided, all being alike and adapted to fit snugly over two adjacent rail members so as to be movable with slight effort on the members. Each sleeve comprises a tubular body portion 13 having a longitudinal slot 14 therein of suitable width to receive a binding screw to permit longitudinal adjustment of the rail, the wall of the body portion having a suitable number of notches 15 at one side of the slot into which the screw may be shifted to afford positive locking of the parts together without depending entirely on frictional resistance or requiring great screw pressure. Two of the sleeves are connected with the members of the base rails respectively so that the binding screws project upwardly, and the body portions 13' of two similar sleeves are connected with the members of the upper rails respectively and set so that the heads 12' are under the sleeves and unobstructed. Each binding screw preferably is provided with a clamp plate 16 curved to contour of the sleeve and being arranged on the screw and adapted to cover the adjacent portions of the slot and notches, the head of the screw having contact directly with the clamp plate to cause the plate to draw the wall of the sleeve tightly against the rail member beneath it. This arrangement permits the effective lengthening or shortening of the base rails and the top rails. The base rail members 8 and 8' have back rail members 17 and 18 integral therewith respectively which in normal arrangement preferably extend upwardly at opposite inclinations therefrom, and they have obtuse angled rail members 19 and 20 thereon respectively that are coupled together by one of the sleeves 13'', the sleeve being normally horizontal and sufficiently high to prevent the rail being pushed under the back cushion 3 while affording a measure of frame elasticity. The members 17 and 18 stand approximately at right angles to the base members. The top rail members 9 and 9' have back members 21 and 22 respectively that normally extend downwardly on opposite inclination and have horizontal or relatively obtuse angled members 19' and 20' thereon respectively that are coupled together by one of the sleeves 13''', so that the upper back rail is not liable to be pushed over the top of the back cushion 3 while affording a measure of elasticity to the upper portion of the frame.

A flexible back rest 23 is provided which preferably is composed of canvas which may be of a striped variety as indicated, and two opposite edge portions thereof are secured to the posts 4 and 5 respectively, the frame holding the canvas under tension as may be desired or permitting curvature as shown which may be more comfortable to the small persons.

In some cases a back plate 24 is provided which is vertically arranged behind the back rails so as to be directly in contact with the fuller portion of the back cushion 3, being of sufficient length to extend downward to the seat cushion 2. The back plate is suitably secured to the back rails, or to one of them, preferably by means of a clamp 25 and a bolt 26, and preferably the lower end of the back plate has a relatively angular foot portion 27 thereon for support upon the seat cushion.

In practical use the back support may be instantly placed upon any seat where needed and have support against the seat back, being especially useful in connection with motor-vehicle seats, and when not desired for use may be instantly removed. If it be desired to stow it away in a small space the various parts of the frame may be quickly disassembled and the whole arranged in folded and compact order, permitting the support to be carried in knock-down condition within small space in a motor-vehicle.

What is claimed is:

1. An adjustable back support having a non-rigid frame composed of base rails and top rails and two posts connected each to a base rail and a top rail, each of the rails having longitudinal adjustability, a back rail connected to the base rails and having longitudinal adjustability, a back rail connected to the top rails and having longitudinal adjustability, and a flexible support connected to the two posts.

2. An adjustable back support comprising two horizontal longitudinally-extensible base rails, two upright posts fixed to one end of the base rails respectively, a back rail fixed to the opposite ends of the base rails respectively, two horizontal longitudinally-extensible top rails fixed at one end to the tops of the posts respectively, a back rail fixed to the opposite ends of the top rails respectively, and a flexible back-supporting device secured to the upright posts between the base rails and the top rails.

3. An adjustable back support comprising two horizontal base rails having each a lateral inclined back rail member fixed on the rearward end thereof, said members being adjustably connected together, two posts vertically fixed on the forward ends of the base rails respectively, two horizontal top rails fixed to the posts and having each a lateral downwardly-extensible inclined back rail member fixed thereto, the inclined members being adjustably connected together, and a flexible back-supporting device secured to the posts.

4. In an adjustable back support, the combination of a plurality of base rails comprising each a plurality of co-operating members having each a clamp screw threaded therein and a sleeve on the members having a longitudinal slot and notches in one side of the slot receiving the screws, two posts integral with one member of the base rails respectively, a pair of longitudinally-extensible top rails fixed to the posts, a plurality of back rails fixed to the base rails and the top rails respectively, and a flexible back-supporting device secured to the posts.

5. In an adjustable back support, the combination of a skeleton frame having a pair of upright posts and base rails and top rails horizontally fixed to the posts, and also a back rail fixed to the base rails and a back rail fixed to the top rails, each rail comprising two co-operating members and a sleeve adjustably connected thereto, the sleeve having a longitudinal slot and notches in one side of the slot, curved clamp plates arranged on the sleeve, and clamp screws in said plates and extending through said notched slots and being threaded into said members respectively.

6. In a back support, the combination of a skeleton frame comprising two base rails having each a lateral lower back rail member fixed thereto, a coupling sleeve adjustably secured to the back rail members, two posts fixed vertically on the base rails respectively, a back-supporting device secured to the posts, two top rails fixed to the tops of the posts respectively and having each a lateral upper back rail member fixed thereto, a coupling sleeve adjustably secured to the upper back rail members, and a back plate vertically arranged behind said sleeves and detachably secured to one of the sleeves, the back plate having a relatively angular foot plate on its lower end.

In testimony whereof, we affix our signatures on the 13th day of August, 1927.

IVA B. LINEBARGER.
WILBERT F. BLUE.